April 11, 1961 R. A. KIMBER 2,978,948
OPTICAL SCANNING DEVICE
Filed July 25, 1956 2 Sheets-Sheet 1

INVENTOR
RAYMOND ARTHUR KIMBER
BY
AGENT

April 11, 1961

R. A. KIMBER 2,978,948

OPTICAL SCANNING DEVICE

Filed July 25, 1956

INVENTOR
RAYMOND ARTHUR KIMBER
BY
AGENT

United States Patent Office 2,978,948
Patented Apr. 11, 1961

2,978,948

OPTICAL SCANNING DEVICE

Raymond Arthur Kimber, Leicester, England, assignor to The Mullard Radio Valve Company Limited, London, England Filed July 25, 1956, Ser. No. 600,127

7 Claims. (Cl. 88—1)

This invention relates to optical scanning devices.

In certain applications it is necessary to explore a band of light or other radiation or to produce and deflect a line of light or an optical beam of narrow substantially rectangular cross-section (hereinafter referred to as a "ribbon" beam), and such an operation may be effected with the aid of a travelling mask having a slit transverse to the direction of motion or a travelling cylindrical or like lens having its axis transverse to the direction of motion.

A scanning device of the type described in the present invention provides an enlarged illuminated scale indication of a mechanical movement. Thus, a tiny movement of rotating members, which is imperceptible to the human eye, may, through an optical magnifying system comprising a mirror system and the scanning device of the present invention, produce a ribbon of light which may be projected on a large scale to indicate such movement dimensionally.

One application of such a scanning device is described in copending United States patent application, Serial Number 432,267, filed May 25, 1954, and now Patent No. 2,880,512. Said copending application describes apparatus for measuring dimensions or relative positions of moving parts which essentially includes means for presenting a predetermined desired dimension or position in digital form, electro-optical means for effecting interpolation between divisions of a main or coarse scale and obtaining thereby the measurement of an actual dimension or position, means for comparing said desired and actual dimensions or positions and obtaining therefrom an indication or signal representing the sign or direction of any error due to a difference therebetween or the magnitude and sign of such error. Preferably the apparatus includes an interpolation scale member with scale divisions, a main or coarse scale and means for scanning synchronously the divisions of said interpolation scale and a corresponding portion of said main or coarse scale, said scanning being effected synchronously in the sense that corresponding fractions of the two scans are carried out in equal times.

Thus, where accurate positioning of a member making a desired movement, such as a jig boring machine, is desired optical magnification of the type described is utilized to insure great accuracy because it enables visual observation of the movement and therefore control thereof.

It is an object of the present invention to provide an improved scanning device suitable for applications as indicated above.

According to the present invention an optical scanning device essentially comprises a substantially rectilinear optical scanning element, and means for moving said element along a circular path while maintaining its aperture in a constant plane and maintaining its operative axis parallel to itself. Said scanning element is rectilinear in the sense that it produces or accepts a rectilinear band or line of light or a beam of thin substantially rectangular cross-section, the term "light" being used herein so as to include invisible light, for example infra-red and ultra-violet. Such element may for example be a rectilinear slit in a mask or a cylindrical lens surrounded by a mask, in which case the operative axis may be taken as the major axis of the slit or the geometrical axis of the lens. Alternatively, the scanning element may be a parallel concave parabolic mirror, in which case the operative axis may be taken as the focal line.

Since the motion of the scanning element is circular, a dynamically balanced construction may readily be obtained. Moreover, since said motion is such as to maintain the axis and aperture of the scanning element in a constant plane or planes, there is the further advantage that a constant or substantially constant focal distance can be achieved.

The circular travel of the scanning element or elements may be obtained by parallel linkage or crank and connecting-rod mechanisms, but preferably such motion is obtained with the aid of epicyclic gearing. Thus, for example a scanning element may be mounted on a planetary gear which is rotatably mounted on a rotary carrier and is maintained in a constant attitude by engagement with a sun gear or an internally toothed peripheral gear arranged to rotate at a suitable angular speed in relation to the carrier.

The scanning element may be used in various ways, and it may for example be illuminated by a stationary light source during a limited portion of its circular travel and it may be utilized over its full length. Preferably, however, the scanning device is used in conjunction with an elongated rectangular window parallel to the plane of circular motion and having its major dimension transverse to the operative axis of the scanning element, the smaller dimension of such window being shorter than the axial dimension of said elements so as to intercept a portion of constant length of the element. In the latter event, the relationship between the axial length of the element and the width of the window is such that the ends of the scanning element remain outside the field of the window during the whole of the selected portion of its circular travel, and preferably the window is so located as to intercept a symmetrical portion of the circular travel of the scanning element.

As will be appreciated, the scanning motion of the device will be of a harmonic nature if the circular motion is effected at constant angular speed, but this non-linearity is acceptable in many applications, including that described in the aforesaid copending application. Nevertheless, it is desirable to restrict the operation of the device to about 60° or less of the circular travel in order to limit the changes in scanning velocity.

In order that the invention may be readily carried into effect, it will now be described with reference to the accompanying drawing, wherein.

Figure 1:
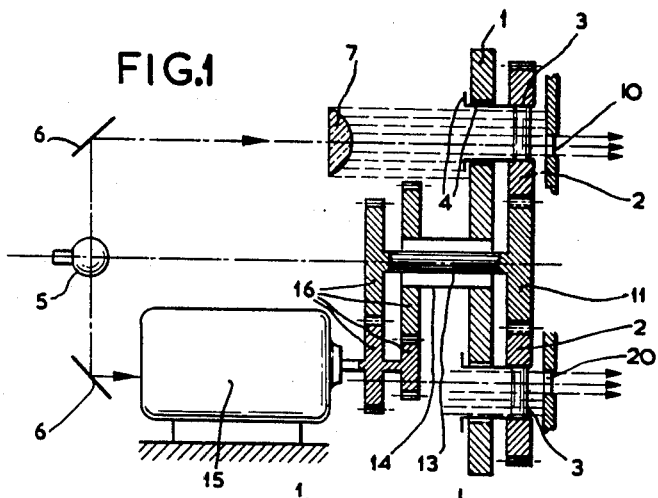
Fig. 1 is a sectional diagram of an embodiment of the device of the present invention.
Figure 2:
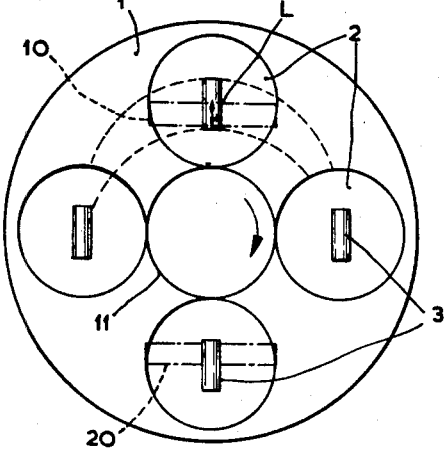
Fig. 2 is a schematic diagram of the carrier disc form 1 of the embodiment of Fig. 1.

Referring now to Figures 1 and 2 of the drawings, the device shown diagrammatically comprises a carrier of disc form 1 having rotatably mounted on it four planetary gears 2 each of which carries a cylindrical rod lens 3. Said planetary gears are mounted on the disc by means of hollow shafts 4 (Figure 1) adapted to pass light from a source 5 via a mirror 6 and optical system 7 to a horizontal rectangular window 10 having scale means thereon which is to be scanned by a line of light or ribbon beam projected by each lens 3 in turn.

The lenses 3 are mounted diametrically within the shafts 4 and are maintained in a vertical position throughout their circular motion; this is achieved by engagement of the gears 2 with a common sun gear 11. If the sun gear has a diameter equal to that of the planetary gears it will be driven at twice the speed of the carrier disc 1. As is shown in Figure 2, the axial length of each lens 3 is greater than the smaller dimension or height of the window 10 so that the window intercepts a constant length of each lens. By this arrangement, a line of light of constant length will appear at the window throughout the scan as shown schematically at L. The motion thereof will be of a harmonic nature as aforementioned, but the changes in speed occurring during a scan will be moderate due to the fact that the window has a length such as to select only a relatively small fraction of the rotary motion of the lens, e.g., about 60° thereof.

As the rotary speeds of the carrier 1 and sun gear 11 should be synchronized, it is desirable that they should be actuated from a common drive. This may be done for example as shown in Figure 1 by mounting the sun gear 11 on a shaft 13 concentrically mounted within a hollow shaft 14 carrying the disc 1 and driving both shafts from a common motor 15 through a gear system 16 comprising gear elements 16a, 16b, 16c and 16d and providing 2:1 ratio.

Since the system employs only rotary motion without any reversal mechanisms, it can be accurately balanced dynamically and therefore high speeds may be employed if desired. Moreover, the provision of four lenses permits four scans for each revolution of the carrier disc 1. In addition, the latter feature permits simultaneous scanning of two scales and a second scale is shown at 20 for this reason, together with a second mirror 6. If the device is employed on a machine tool having distance measuring means in accordance with the aforementioned patent application, two orthogonal measuring systems may be served by employing the scanning beams emerging from scales 10 and 20 respectively to project successive scale divisions via mirror system (not shown).

Although it is important to reduce backlash, tooth pitch errors and tooth wear on the gears to a minimum since the lenses should be maintained very accurately orientated, such effects are reduced by the fact that the lenses are mounted at the centers of the planetary gears.

However, these effects may be further reduced by employing split or twin gears wherein the two halves are oppositely spring-loaded. An example of the latter feature is shown in Figure 3 which is a horizontal axial section through a construction which is in accordance with Figures 1 and 2 except for the fact that the drive from the motor 15 is imparted to the carrier disc 1 by engagement of a driving gear 31 on its periphery instead of driving it through a central shaft such as the shaft 14 of Figure 1.

Figure 3:
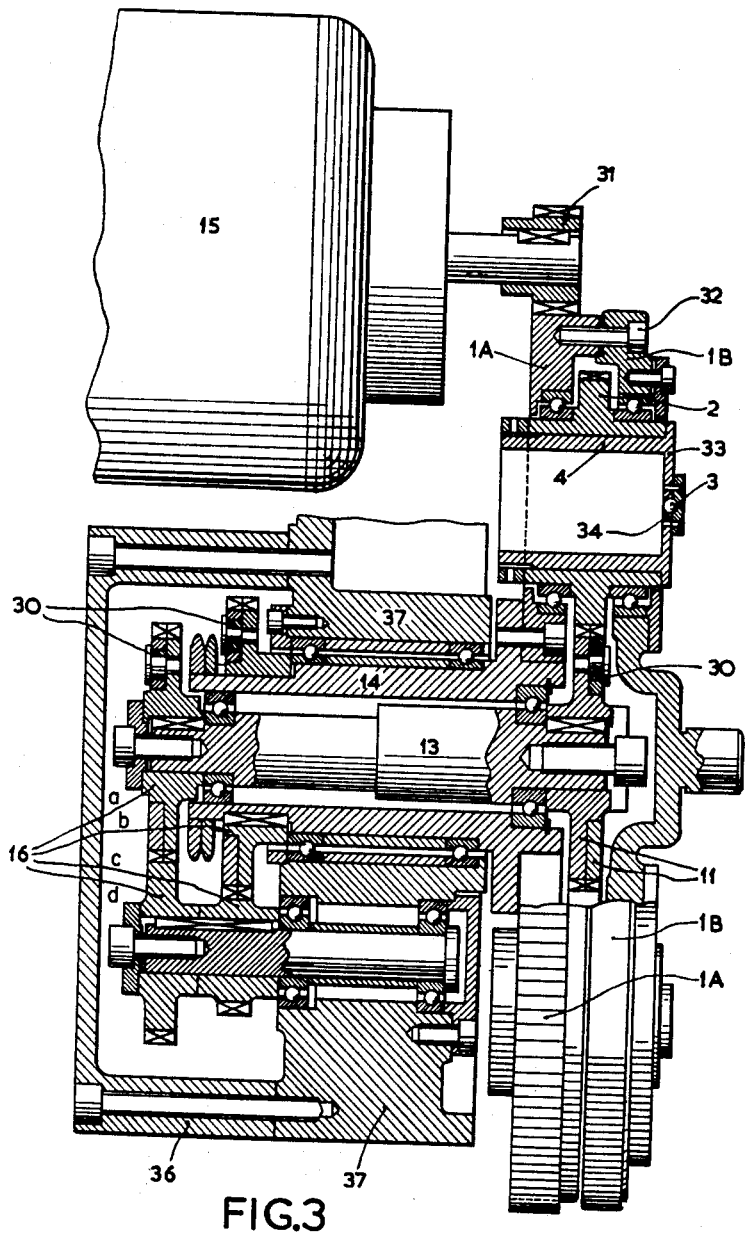
Fig. 3 is a sectional diagram of a modification of the embodiment of Fig. 1.

In Figure 3, in which corresponding parts carry the same reference numerals, the sun gear 11 and two of the gears 16 are of split construction and have their halves connected by small rubber bushings 30 appropriately effecting an angle equal to a fraction of the tooth pitch. If such a method is adopted, random changes in the alignment of the lenses will be virtually eliminated whereas wear will give a gradual change in a constant direction which can be corrected at intervals of time.

In Fig. 3, the driving gear 31 is shown engaging a toothed periphery of the carrier 1, the latter being in this case constituted by two dished halves 1A, 1B bolted together as at 32. The hollow shafts 4 of the planetary gears 2 are more clearly shown in Fig. 3, the lenses 3 being each mounted on an end plate or mask 33 in V blocks 34 which may be adjustable.

In this example, since motor drive is effected at the periphery of the carrier 1A, 1B, the train of gears 16 drives the sun gear 11 from the hollow shaft 14 of the carrier disc 1. The gears 16 are located in a housing 36 secured to a fixed chassis 37.

Where two scales are scanned by a single system such as that of Figures 1 and 2 or Figure 3, it may be desirable to provide a shutter mechanism to ensure that the scales are scanned by different lenses. In fact it may be advantageous to accurately align each scale with two selected lenses, and this may arise with fine precision systems, e.g. with scales of 2 inches in length subdivided by 1000 opaque division lines for use as 0.0001 inch interpolation scales in conjunction with a coarse scale in a system in accordance with the aforesaid patent application.

Figure 4:
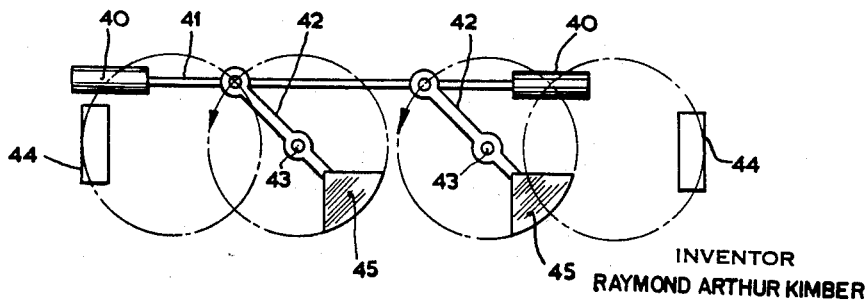
Fig. 4 is a schematic diagram of another embodiment of the device of the present invention.

Figure 4 shows schematically an alternative arrangement in which two lenses 40 are mounted on the ends of a connecting rod 41 carried by rotating cranks 42 coupled together for simultaneous rotation around axes 43 by any suitable means. Suitable scale positions are shown at 44 where the path of the lenses is clear of the mechanism, and counterweights for dynamic balancing of the system are indicated schematically at 45.

Although examples employing four and two scanning elements respectively have been described, it will be appreciated that other numbers of elements or a single element may be employed. Moreover, if it is desired to scan two scales disposed at right angles to each other, the arrangements of Figures 1 to 3 may readily be modified by turning two of the planetary gears through 90° and arranging for the respective lenses to scan a scale 20 transferred to a vertical position at one side of the system.

It will also be appreciated that the devices described have the further advantage that the scanning process does not involve a flyback stroke.

What is claimed is:

1. An optical scanning device comprising a light source, a parallel-sided elongated scanning element having a minor axis and an elongated major axis relative to said minor axis for transmitting light from said light source positioned with its major axis in a predetermined position, stationary masking means having a window with a minor axis and an elongated major axis relative to said minor axis for transmitting light from said light source, the minor axis of said window being substantially shorter than the major axis of said scanning element, and means for moving said scanning element in a substantially circular direction in a plane substantially parallel to that of said masking means interposed between said light source and the said masking means with the major axis of the said scanning element transverse to that of said window and maintained substantially parallel to its initial position in motion whereby the said window transmits a substantially rectilinearly moving beam of light.

2. An optical scanning device comprising a light source, a first circular toothed member having a fixed axis, means for axially rotating said first member, a second circular toothed member having an axis parallel to the axis of said first member and driven by the said first member in an epicyclic direction, a parallel-sided elongated scanning element having a minor axis and an elongated major axis relative to said minor axis for transmitting light from said light source mounted in said second member with its major axis substantially parallel to a diameter thereof, said first and second members being coupled to maintain the major axis of said scanning element substantially parallel to its initial position during motion of the axis of said second member, and stationary masking means having a window with a minor axis and an elongated major axis relative to said minor axis for transmitting light from said light source, the minor axis of said window being substantially shorter than the major axis of said scanning element, said first and second members being interposed between said light source and said masking means in a plane substantially parallel to that of the said masking means with the major axis of said scanning element transverse to that of said window whereby the said window transmits a substantially rectilinearly moving beam of light.

3. An optical scanning device comprising a light source, a first circular toothed member having a fixed axis, means for axially rotating said first member, a second circular toothed member having an axis parallel to the axis of said first member and driven by the said first member in an epicyclic direction, an elongated cylindrical lens having a minor axis and an elongated major axis relative to said minor axis for transmitting light from said light source mounted in said second member with its major axis substantially coincident with a diameter thereof, said first and second members being coupled to maintain the major axis of said lens parallel to its initial position during motion of the axis of said second member, and stationary masking means having a window with a minor axis and an elongated major axis relative to said minor axis for transmitting light from said light source, the minor axis of said window being substantially shorter than the major axis of said lens, said first and second members being interposed between said light source and said masking means in a plane substantially parallel to that of the said masking means with the major axis of said lens transverse to that of said window whereby the said window transmits a substantially rectilinearly moving beam of light.

4. An optical scanning device comprising a light source, a first circular toothed member having a fixed axis, means for axially rotating said first member, a plurality of second circular toothed members each having an axis parallel to the axis of said first member and driven by the said first member in an epicyclic direction, a plurality of parallel-sided elongated scanning elements each having a minor axis and an elongated major axis relative to said minor axis for transmitting light from said light source, one of said scanning elements being mounted in each of said second members with its major axis substantially parallel to a diameter thereof, said first and second members being coupled to maintain the major axis of each of said scanning elements substantially parallel to its initial position during motion of the axis of each of said second members, and stationary masking means having a window with a minor axis and an elongated major axis relative to said minor axis for transmitting light from said light source, the minor axis of said window being substantially shorter than the major axis of each of said scanning elements, said first and second members being interposed between said light source and said masking means in a plane substantially parallel to that of the said masking means with the major axis of each of said scanning elements transverse to that of said window whereby the said window transmits a substantially rectilinearly moving beam of light.

5. An optical scanning device comprising a light source, a first circular toothed member having a fixed axis, means for axially rotating said first member, a plurality of second circular toothed members each having an axis parallel to the axis of said first member and driven by the said first member in an epicyclic direction, a plurality of parallel-sided elongated scanning elements each having a minor axis and an elongated major axis relative to said minor axis for transmitting light from said light source, one of said scanning elements being mounted in each of said second members with its major axis substantially parallel to a diameter thereof, said first and second members being coupled to maintain the major axis of each of said scanning elements substantially parallel to its initial position during motion of the axis of each of said second members, and stationary masking means having a pair of windows positioned in spaced relation from each other each having a minor axis and an elongated major axis relative to said minor axis for transmitting light from said light source, the minor axis of each of said windows being substantially shorter than the major axis of each of said scanning elements, said windows being substantially diametrically opposed, said first and second members being interposed between said light source and said masking means in a plane substantially parallel to that of the said masking means with the major axis of each of said scanning elements transverse to that of each of said windows whereby each of the said windows transmits a substantially rectilinearly moving beam of light.

6. An optical scanning device comprising a light source, a rod-like member, means for moving said member in a manner whereby each end of the said member moves in a substantially circular motion, a pair of parallel-sided elongated scanning elements each having a minor axis and an elongated major axis relative to said minor axis for transmitting light from said light source and maintained substantially parallel to its initial position in motion, one of said scanning elements being mounted on each end of said member with its major axis substantially coincident with that of the said member, and stationary masking means having a pair of windows positioned in spaced relation from each other each having a minor axis and an elongated major axis relative to said minor axis for transmitting light from said light source, the minor axis of each of said windows being substantially shorter than the major axis of each of said scanning elements, said windows being substantially diametrically opposed, said member being interposed between said light source and said masking means in a plane substantially parallel to that of the said masking means with the major axis of each of said scanning elements transverse to that of each of said windows and maintained substantially parallel to its initial position in motion whereby each of the said windows transmits a substantially rectilinearly moving beam of light.

7. An optical scanning device comprising a light source, a pair of parallel-sided elongated scanning elements each having a minor axis and an elongated major axis relative to said minor axis for transmitting light from said light source and maintained substantially parallel to its initial position in motion, stationary masking means having a pair of windows each with a minor axis and an elongated major axis relative to said minor axis for transmitting light from said light source, the minor axis of each of said windows being substantially shorter than the major axis of each of said scanning elements, and means for moving each of said scanning elements in a substantially circular direction in a plane substantially parallel to that of said masking means interposed between said light source and the said masking means with the major axis of each of the said scanning elements transverse to that of each of said windows and maintained substantially parallel to its initial position in motion whereby each of the said windows transmits a substantially rectilinearly moving beam of light.

References Cited in the file of this patent

UNITED STATES PATENTS

| | | |
|---|---|---|
| 343,899 | Fournet | June 15, 1866 |
| 1,201,813 | Fitzwilliam | Oct. 17, 1916 |
| 1,389,022 | Wadsworth | Aug. 30, 1921 |
| 1,965,755 | Warmisham | July 10, 1934 |
| 2,408,115 | Varian | Sept. 24, 1946 |

FOREIGN PATENTS

| | | |
|---|---|---|
| 367,592 | Great Britain | Feb. 25, 1932 |
| 394,285 | Great Britain | June 22, 1933 |
| 445,938 | Great Britain | Apr. 20, 1936 |